(12) United States Patent
Park et al.

(10) Patent No.: US 9,258,393 B2
(45) Date of Patent: Feb. 9, 2016

(54) MOBILE TERMINAL

(71) Applicants: Sanggil Park, Chungcheongnam-Do (KR); Iljae Lee, Incheon (KR); Seongwoo Choi, Gyeonggi-Do (KR)

(72) Inventors: Sanggil Park, Chungcheongnam-Do (KR); Iljae Lee, Incheon (KR); Seongwoo Choi, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 13/872,767

(22) Filed: Apr. 29, 2013

(65) Prior Publication Data

US 2013/0303243 A1   Nov. 14, 2013

(30) Foreign Application Priority Data

May 10, 2012   (KR) .......................... 10-2012-0049899

(51) Int. Cl.
*H04M 1/02*   (2006.01)
*H01Q 1/24*   (2006.01)

(52) U.S. Cl.
CPC ............. *H04M 1/0206* (2013.01); *H01Q 1/243* (2013.01); *H04M 1/026* (2013.01); *H04M 1/0262* (2013.01); *H04M 1/0277* (2013.01)

(58) Field of Classification Search
CPC .............. H01Q 1/241–1/243; H04M 1/02; H04M 1/0202; H04M 1/0206; H04M 1/026; H04M 1/0262; H04M 1/0274; H04M 1/0277

USPC .................. 455/550.1, 575.1, 575.3–575.8
See application file for complete search history.

(56) References Cited

U.S. PATENT DOCUMENTS

2007/0241971 A1*  10/2007  Tsujimura et al. ............. 343/702
2008/0182539 A1*  7/2008  Hata et al. .................... 455/269

FOREIGN PATENT DOCUMENTS

| CN | 101110849 A | 1/2008 |
| EP | 2226869 A1 * | 9/2010 |
| EP | 2343868 A2 | 7/2011 |

OTHER PUBLICATIONS

European Search Report dated Sep. 4, 2013 for corresponding Application No. 13165855.1.
Chinese Office Action issued in Application No. 201310172849.2 dated Mar. 26, 2015.

* cited by examiner

*Primary Examiner* — George Eng
*Assistant Examiner* — Umair Ahsan
(74) *Attorney, Agent, or Firm* — Ked & Associates, LLP (57) ABSTRACT

A mobile terminal includes a terminal main body, a circuit board, an antenna device and a connecting portion. The terminal main body has a plurality of members. The circuit board and an antenna device are built in the terminal main body so as to be spaced apart from each other. The connecting portion electrically connects the circuit board and the antenna device to each other. In the mobile terminal, the connecting portion is a conductive pattern formed on one surface of at least one of the members defining an internal space of the terminal main body.

21 Claims, 7 Drawing Sheets

MOBILE TERMINAL

CROSS-REFERENCE TO RELATED APPLICATION(S)

Pursuant to 35 U.S.C. §119(a), this application claims the benefit of earlier filing date and right of priority to Korean Application No. 10-2012-0049899, filed on May 10, 2012, the contents of which is incorporated by reference herein in its entirety.

BACKGROUND OF THE INVENTION

1. Field of the Invention

The present disclosure relates to a mobile terminal having a means capable of electrically connecting components mounted in the mobile terminal.

2. Description of the Conventional Art

As functions of a terminal are varied, the terminal is implemented as a type of a multimedia player having complex functions, for example, a function of photographing photos or moving pictures, a function of reproducing music and moving picture files, a function of playing games, a function of receiving broadcasting, etc.

Terminals may be divided into a mobile/portable terminal and a stationary terminal depending on their mobility. The mobile terminal is a portable device that can be carried anywhere and have one or more of a function of performing voice and video calls, a function of inputting/outputting information, a function of storing data, etc.

Efforts for improving the structural and/or software part of the mobile terminal have been made in order to support and develop these functions of the mobile terminal.

Particularly, in a case where a flexible cable, flexible circuit board or coaxial cable is used to connect between components mounted in the mobile terminal, it is required to secure a separate space inside the mobile terminal. Accordingly, it is difficult to secure a space in which other devices can be mounted inside the terminal. Since the structure in the mobile terminal is complicated, the number of assembling processes increases, and production cost increases.

Therefore, it is required to consider a new structure capable of substituting for the flexible cable, flexible circuit board or coaxial cable.

SUMMARY OF THE INVENTION

Therefore, an aspect of the detailed description is to provide a mobile terminal having a connecting portion capable of electrically connecting components in a narrow space.

To achieve these and other advantages and in accordance with the purpose of this specification, as embodied and broadly described herein, a mobile terminal includes a terminal main body having a plurality of members; a circuit board and an antenna device, built in the terminal main body so as to be spaced apart from each other; and a connecting portion electrically connecting the circuit board and the antenna device to each other, wherein the connecting portion is a conductive pattern formed on one surface of at least one of the members defining an internal space of the terminal main body.

In one exemplary embodiment, the circuit board may include a controller formed to process a radio signal transmitted/received through the antenna device.

In one exemplary embodiment, a connection terminal contacting the connecting portion so as to be electrically connected to the connecting portion may be formed on one surface of the circuit board opposite to the connecting portion.

In one exemplary embodiment, the connecting portion may further include a non-conductive pad disposed to the one surface of the member.

In one exemplary embodiment, the conductive pattern may be configured with first and second patterns formed to the spaced apart from each other on one surface of the non-conductive pad.

In one exemplary embodiment, the conductive pattern may be configured with first and second patterns stacked with a non-conductive material interposed therebetween.

In one exemplary embodiment, the member having the connecting portion formed thereon may be a frame formed to support the inside of the mobile terminal.

In one exemplary embodiment, the member having the connecting portion formed thereon may be a case forming the exterior appearance of the mobile terminal.

In one exemplary embodiment, the member having the connecting portion formed thereon may be a battery formed to supply power to the mobile terminal, and the connecting portion is formed on one surface of the battery.

In one exemplary embodiment, the terminal main body may have an accommodating portion formed to accommodate the battery therein. When the battery is accommodated in the accommodating portion, a first connection terminal connecting the connecting portion and the circuit board to each other may be formed at a first side of the accommodating portion, and a second connection terminal connecting the connecting portion and the antenna device to each other may be formed at a second side of the accommodating portion.

To achieve these and other advantages and in accordance with the purpose of this specification, as embodied and broadly described herein, a mobile terminal includes a terminal main body having a circuit board built at an upper portion thereof, and having a plurality of members; an interlock portion built at a lower portion of the terminal main body so as to be spaced apart from the circuit board, and communicating electrical signals with the circuit board; and a connecting portion electrically connecting the circuit board and the interlock portion to each other, wherein the connecting portion is a conductive pattern formed on any one surface of the member extended from the interlock portion to the circuit board.

In the mobile terminal according to the exemplary embodiments configured as described above, a circuit board and an interlock portion are connected to each other by forming a conductive pattern on any one of members constituting the mobile terminal, instead of a flexible cable, flexible circuit board or coaxial cable, so that it is not required to secure a separate space in which the flexible cable, flexible circuit board or coaxial cable is disposed inside the mobile terminal.

Accordingly, it is possible to secure a space in which other devices can be mounted inside the mobile terminal. Further, the structure in the mobile terminal is simplified, so that it is possible to decrease the number of assembling processes and to reduce production cost of the mobile terminal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

DETAILED DESCRIPTION OF EXEMPLARY EMBODIMENTS

Hereinafter, a mobile terminal of the present disclosure will be explained in more detail with reference to the attached drawings. The suffixes "module" and "unit or portion" for components used in the following description merely provided only for facilitation of preparing this specification, and thus they are not granted a specific meaning or function. For the sake of brief description with reference to the drawings, the same or equivalent components will be provided with the same reference numbers, and description thereof will not be repeated. Singular expressions include plural expressions which do not have any obviously different meaning in view of a context.

The mobile terminal according to the present disclosure may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present invention may be also applicable to a fixed terminal such as a digital TV and a desktop computer.

Figure 1:
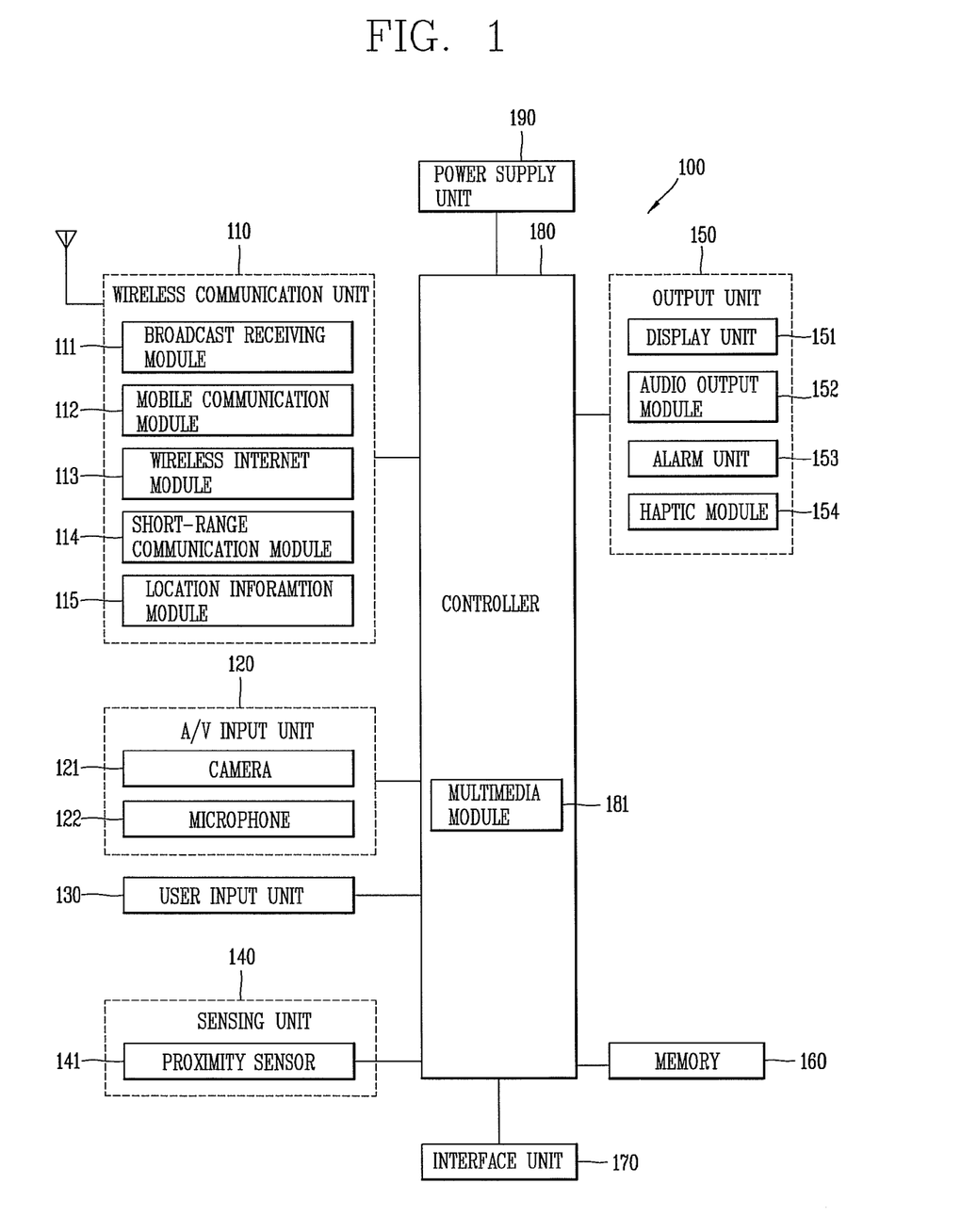
FIG. 1 is a block configuration diagram of a mobile terminal according to an exemplary embodiment.

The mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The wireless communication unit 110 typically includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may be provided via a mobile communication network. In this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display 151.

The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display 151, an audio output module 152, an alarm unit 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call or other communication (such as text messaging, multimedia file downloading, etc.). When the mobile terminal 100 is in a video call mode or image capturing mode, the display 151 may display a captured image and/or received image, a UI or GUI.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface of the display 151 may also be implemented to be optically transparent. Under this configuration, a user can view an object positioned at a rear side of a body through a region occupied by the display 151 of the body.

The display 151 may be implemented in two or more in number according to a configured aspect of the mobile terminal 100. For instance, a plurality of displays may be arranged on one surface integrally or separately, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display 151 or the audio output module 152. Accordingly, the display 151 or the audio output module 152 may be classified as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
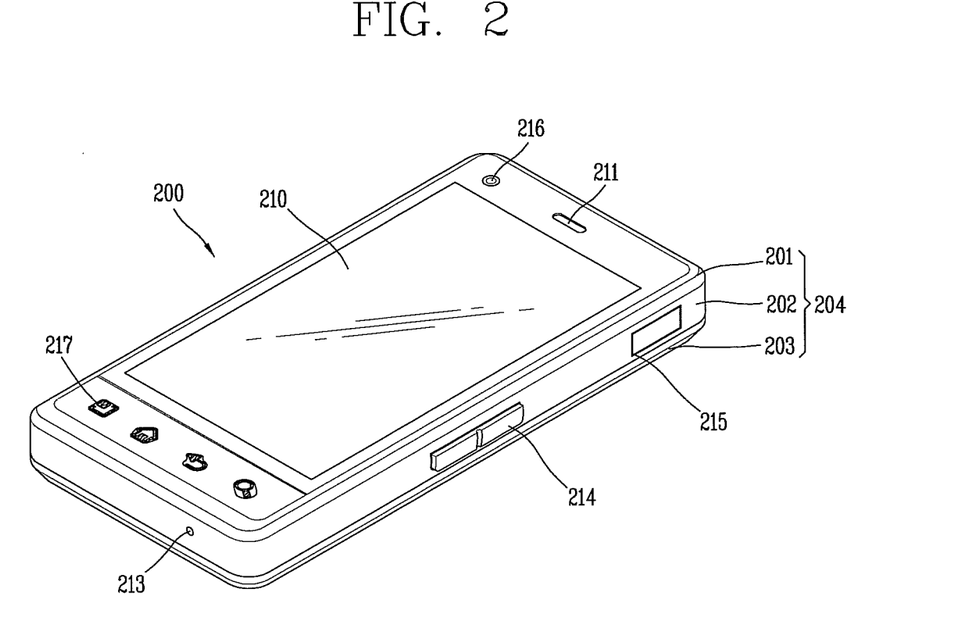
FIG. 2 is a front perspective view of a mobile terminal according to an exemplary embodiment.
Figure 3:
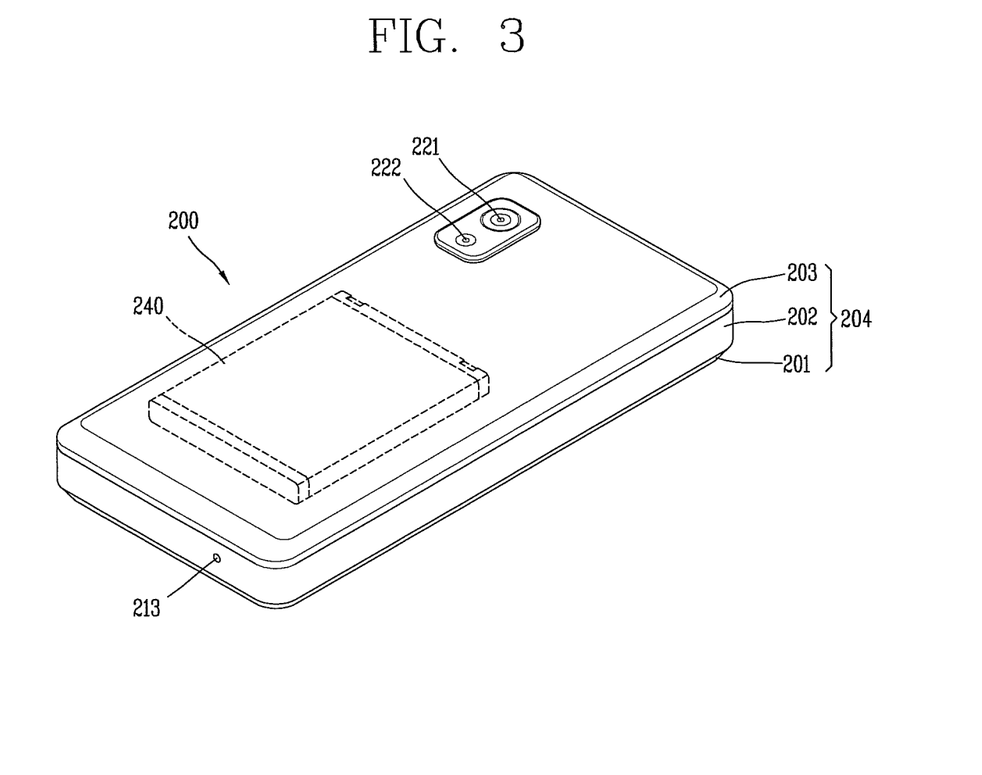
FIG. 3 is a rear perspective view of the mobile terminal of FIG. 2.

FIG. 2 is a front perspective view of a mobile terminal according to the present invention, and FIG. 3 is a rear perspective view of the mobile terminal of FIG. 2.

Referring to FIGS. 2 and 3, the mobile terminal 200 according to the present invention has a bar-type terminal body 204. However, the present invention is not limited to this, but may be applied to a slide type in which two or more bodies are coupled to each other so as to perform a relative motion, a folder type, or a swing type, a swivel type and the like. Further, the mobile terminal of the present invention may be also applicable to any portable electronic device having a camera and a flash, e.g., a portable phone, a smart phone, a notebook computer, a digital broadcasting terminal, Personal Digital Assistants (PDAs), Portable Multimedia Players (PMPs), etc.

The mobile terminal 200 includes a terminal body 204 which forms the appearance of the mobile terminal 200.

The terminal body 204 includes a case (casing, housing, cover, etc.) which forms the appearance of the terminal body 204. The case may include a front case 201, a rear case 202, and a battery cover 203. The battery case 203 is formed to cover the rear surface of the rear case 202.

A space formed by the front case 201 and the rear case 202 may accommodate various components therein. Such cases may be formed by injection-molded synthetic resin, or may be formed using a metallic material such as stainless steel (STS) or titanium (Ti).

On the front surface of the terminal body 204, may be disposed a display 210, a first audio output unit 211, a front camera 216, a side key 214, an interface unit 215 and a user input unit 217.

The display 210 includes a liquid crystal display (LCD) module, organic light emitting diodes (OLED), e-paper, etc., each for visually displaying information. The display 210 may include a touch sensing means for inputting information in a touch manner. Hereinafter, the display 210 including the touch sensing means is called 'touch screen'. Once part on the touch screen 210 is touched, content corresponding to the touched position is input. The content input in a touch manner, may be characters, or numbers, or menu items which can be set in each mode. The touch sensing means may be transmissive so that the display can be viewed, and may include a structure for enhancing visibility of the touch screen at a bright place. Referring to FIG. 2, the touch screen 210 occupies most of the front surface of the front case 201.

The first audio output unit 211 may be implemented as a receiver for transmitting a call sound to a user's ear, or a loud speaker for outputting each type of alarm sound or a playback sound of multimedia.

The front camera 216 processes image frames such as still images or moving images, obtained by an image sensor in a video call mode or a capturing mode. The processed image frames may be displayed on the display 210.

The image frames processed by the front camera 216 may be stored in the memory 160, or may be transmitted to the outside through the wireless communication unit 110. The front camera 216 may be implemented in two or more according to a user's interface.

The user input unit 217 is manipulated to receive a command for controlling the operation of the mobile terminal 200, and may include a plurality of input keys. The input keys may be referred to as manipulation portions, and may include any type of ones that can be manipulated in a user's tactile manner.

For instance, the user input unit 217 may be implemented as a dome switch, or a touch screen, or a touch pad for inputting commands or information in a user's push or touch manner. Alternatively, the user input unit 217 may be implemented, for example, as a wheel for rotating a key, a jog, or a joystick. The user input unit 217 is configured to input various commands such as START, END and SCROLL.

A side key 214, an interface unit 215, an audio input unit 213, etc. are disposed on the side surface of the front case 201.

The side key 214 may be called 'manipulation unit', and may be configured to receive commands for controlling the operation of the mobile terminal 200. The side key 214 may include any type of ones that can be manipulated in a user's tactile manner. Content input by the side key 214 may be variously set. For instance, through the side key 214, may be input commands such as controlling the front and rear cameras 216 and 221, controlling the level of sound output from the audio output unit 211, and converting a current mode of the display 210 into a touch recognition mode.

The audio output unit 213 may be implemented as a microphone for receiving a user's voice, other sound, etc.

The interface unit 215 serves a path through which the mobile terminal 200 performs data exchange, etc. with an external device. For example, the interface unit 215 may be at least one of a connection terminal through which the mobile terminal 200 is connected to an ear phone by cable or radio, a port for local area communication, e.g., an infrared data association (IrDA) port, a Bluetooth portion, a wireless LAN port, and power supply terminals for supplying power to the mobile terminal 200. The interface unit 215 may be a card socket for accommodating an external card such as a subscriber identification module (SIM) card, a user identity module (UIM) card or a memory card for storing information.

A power supply unit 240 and the rear camera 221 are disposed on the rear surface of the terminal body 204.

A flash 222 and a mirror (not shown) may be disposed close to the rear camera 221. When capturing an object by using the rear camera 221, the flash 222 provides light onto the object.

When the user captures an image of himself/herself by using the rear camera 221, the mirror can be used for the user to look at himself/herself therein.

The rear camera 221 may face a direction which is opposite to a direction faced by the front camera 216, and may have different pixels from those of the front camera 216.

For example, the front camera 216 may operate with relatively lower pixels (lower resolution). Thus, the front camera 216 may be useful when a user can capture his face and send it to another party during a video call or the like. On the other hand, the rear camera 221 may operate with a relatively higher pixels (higher resolution) such that it can be useful for a user to obtain higher quality pictures for later use. The front camera 216 and the rear camera 221 may be installed at the terminal body 204 so as to rotate or pop-up.

The power supply unit 240 is configured to supply power to the mobile terminal 200. The power supply unit 240 may be mounted in the terminal body 204, or may be detachably mounted to the terminal body 204.

Figure 4:
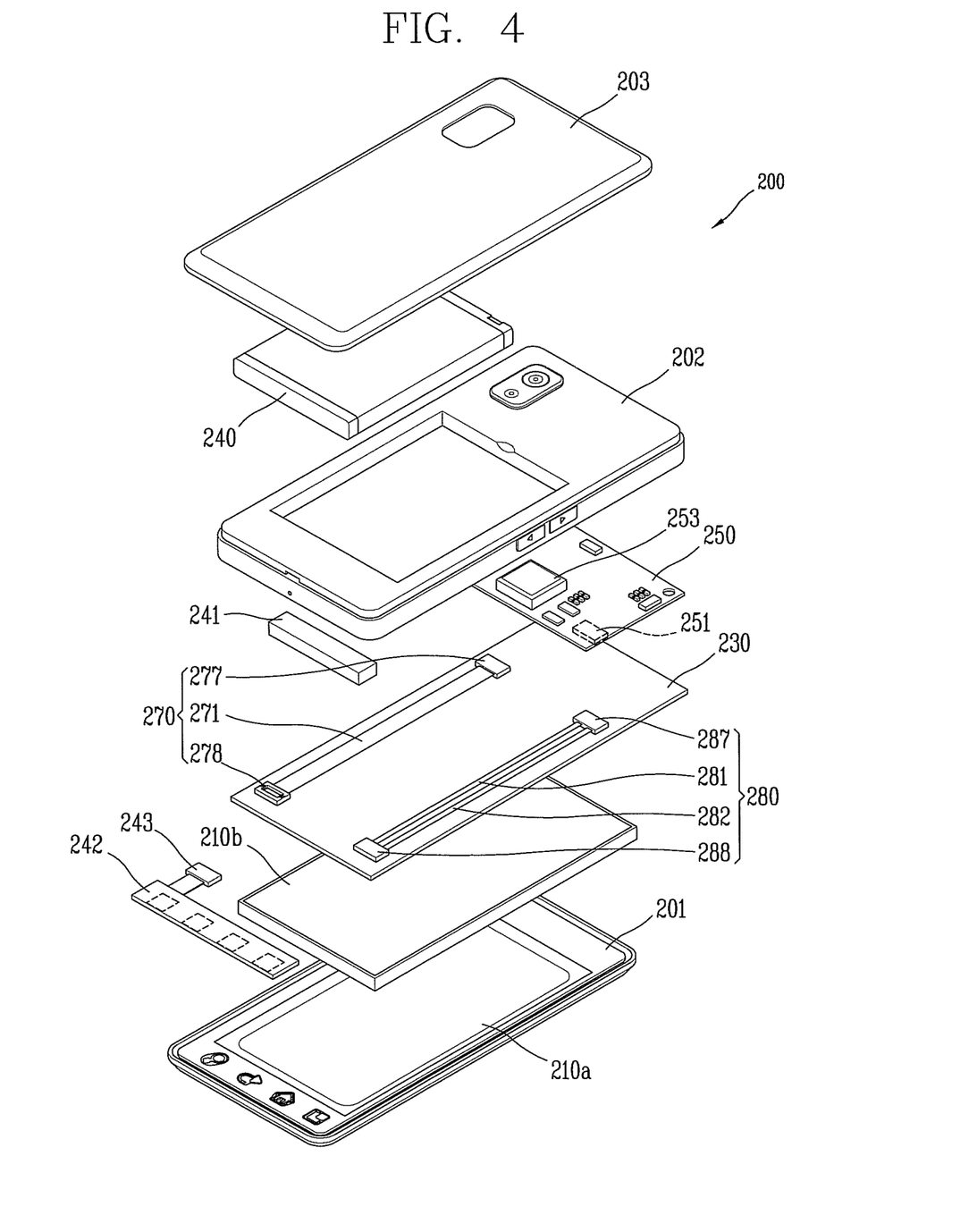
FIG. 4 is an exploded perspective view of FIG. 3.

FIG. 4 is an exploded perspective view of FIG. 3.

Referring to FIG. 4, the mobile terminal includes a window 210a and a display module 210b, which constitute the display unit 210. The window 210a may be coupled to one surface of the front case 201.

A frame 230 is formed to support electrical devices between the front case 201 and the rear case 202. The frame 230 is a support structure inside the mobile terminal. For example, the frame 230 is formed to support at least one of the display module 210b, the camera module 221, an antenna device 241 and a circuit board 250.

A portion of the frame 230 may be exposed to the outside of the mobile terminal. The frame 230 may constitute a portion of a sliding module connecting a main body unit and a display unit to each other in a slide type terminal.

The mobile terminal shown in FIG. 4 is an example. In the mobile terminal, the circuit board 250 is disposed between the frame 230 and the rear case 202, and the display module 210b is coupled to one surface of the frame 230. The circuit board 250 and the battery 240 are disposed on the other surface of the frame 230, and the battery case 203 may be coupled to the rear case 202 so as to cover the battery.

The window 210a is coupled to the one surface of the front case 210. A touch sensor (not shown) may be mounted to the window 210a. The touch sensor is formed to sense a touch input, and has optical transparency. The touch sensor is mounted to the front of the window 210a, and may be configured to convert a change in voltage generated at a specific portion of the window 210a into an electrical input signal.

The display module 210b is mounted to the rear of the window 210a. In the exemplary embodiment, a TFT LCD is used as an example of the display module 210b, but the present disclosure is not necessarily limited thereto.

For example, the display module 210b may be an LCD, OLED, flexible display, 3D display, etc.

The circuit board 250 may be formed on one surface of the frame 230 as described above, but may be mounted beneath the display module 210b. At least one electronic device 253 may be mounted on a lower surface of the circuit board 250.

A battery accommodating portion having a recessed shape is formed on the frame 230 so that the battery 240 can be accommodated in the battery accommodating portion. A contact terminal connected to the circuit board 250 may be formed at one side of the battery accommodating portion so that the battery 240 supplies power to the terminal main body.

The antenna device 241 may be formed at upper or lower end of the mobile terminal. The antenna device 241 may be formed in plural numbers to be disposed at the respective ends of the mobile terminal. The plurality of antenna devices 241 may be formed to transmit/receive radio signals having different frequency bands.

The frame 230 may be formed of a metal material which can maintain sufficient rigidity even though the thickness of the frame 230 is thin. The frame 230 formed of the metal material may act as a ground. In this case, the frame 230 may extend the ground of the mobile terminal.

Referring to FIG. 4, as the mobile terminal is slimmed, the circuit board 250 is miniaturized to have a ½ size of that of the conventional circuit board. The circuit board 250 is formed at an upper portion of the mobile terminal, and interlock portions 241 and 242 interlocked with the circuit board 250 are formed at a lower portion of the mobile terminal so as to be spaced apart from the circuit board 250.

A plurality of members 201, 202, 203, 230 and 240 may be formed in the mobile terminal so as to define a separate space between the circuit board 250 and the interlock portion 241 or 242.

In this case, the circuit board 250 and the interlock portion 241 or 242 may be connected to each other by a flexible cable or flexible circuit board. Alternatively, in a case where the interlock portion is the antenna device 241 formed to transmit/receive a radio signal of the mobile terminal, the circuit board 250 and the antenna device 241 may be connected to each other by a coaxial cable.

However, in a case where the flexible cable, flexible circuit board or coaxial cable is used, it is required to secure a separate space inside the mobile terminal. Accordingly, it is difficult to secure a space in which other devices can be mounted inside the mobile terminal. Since the structure in the mobile terminal is complicated, the number of assembling processes increases, and production cost increases.

In order to solve such a problem, a conductive pattern is formed on any one of the members 201, 202, 230, 230 and 240, instead of the flexible cable, flexible circuit board or coaxial cable, so that the circuit board 250 and the interlock portion 241 or 242 are connected to each other through the conductive pattern. Hereinafter, the structure including the conductive pattern described above will be referred to as a connecting portion 270, 280 or 290.

According to exemplary embodiments described below, the circuit board 250 and the interlock portion 241 or 242 are disposed to be spaced apart from each other.

The circuit board 250 may include a controller 253 that controls the interlock portion 241 or 242 using an electrical signal so that the interlock portion 241 or 242 perform a predetermined operation.

The member is one of components constituting the mobile terminal. For example, the member may be the frame 230 formed to support the inside of the mobile terminal. In addition, the member may be any one of the front case 210, the rear case 202, the battery case 203 and the battery 240.

The interlock portion connected to the circuit board 250 by the connecting portion 270, 280 or 290 may be any one of the antenna device 241 formed to transmit/receive a radio signal, a socket to which an external device is connected, the user input unit through which a user generates input data for controlling an operation of the mobile terminal, the sensing unit formed to sense a state of the mobile terminal, and the output unit outputting a signal to the outside so that the user can recognize the signal.

Here, the socket refers to a device into which at least one portion of an external device is inserted so that the external device can be connected thereto. A SIM card may be used as an example of the external device. The SIM card refers to a card which can store personal information. In addition, a memory card frequently called as a micro SD, such as a T-flash card, or a modem chip such as a chip mobile state modem (MSM) chip may be inserted into the socket.

An interface device, e.g., a port for charging, earphone or data cable, such as a multimedia interface (MMI) connector may be used as another example of the external device.

Figure 5A:
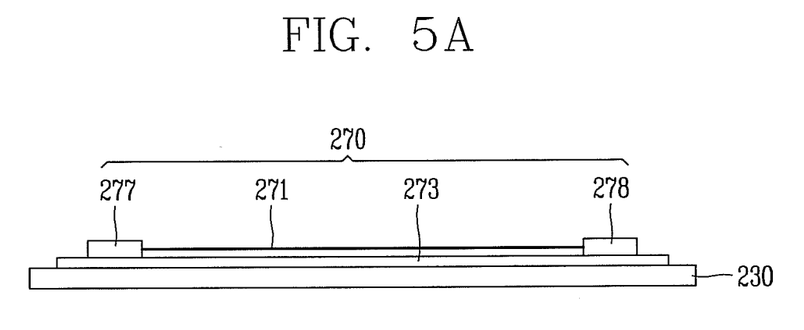
FIGS. 5A and 5B are sectional views illustrating a member on which connecting portions are formed according to exemplary embodiments.
Figure 5B:
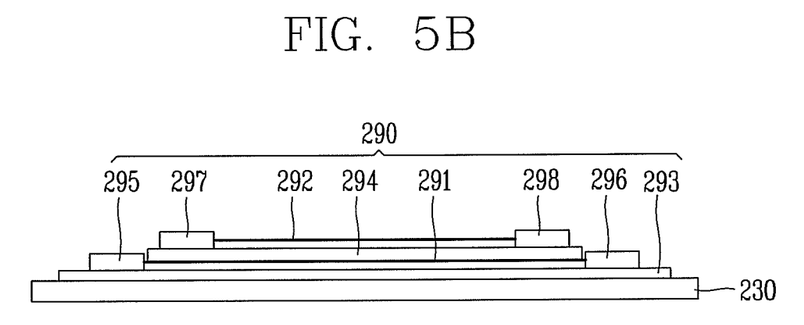

FIGS. 5A and 5B are sectional views illustrating a member on which connecting portions 270 and 290 are formed according to exemplary embodiments. Here, the frame 230 will be described as an example of the member.

Referring to FIG. 5A, a pad 273 is formed on one surface of the member 230. In a case where the member 230 is made of a conductive material, the pad 273 may be made of a non-conductive material. For example, in a case where the frame 230 as the member is made of a conductive material such as stainless steel (STS), the pad 273 may be made of a non-conductive material. A conductive pattern 271 is formed on one surface of the pad 273. The conductive pattern 271 may be formed on the one surface of the pad 273 through a printing or deposition process.

As an example, the connecting portion 270 may be formed on the member 230 by forming the pad 273 with a non-conductive adhesive tape, printing the conductive pattern 271 on the non-conductive adhesive tape, and then coupling the pad 273 to the member 230. As another example, the connecting portion 270 may be formed on the member 230 by printing a non-conductive material on the surface of the member 230 and then printing a conductive material on the non-conductive material. Alternatively, the pad 273 may be deposited on the member 230, and the conductive pattern 271 may be deposited on the pad 273. The deposition process may be any one of a physical deposition process and a chemical deposition process. The pad 273 and the conductive pattern 271 may be formed using different methods.

As such, the connecting portion 270 may be formed on the member 230 using various methods, and the present disclosure is not limited to the method of forming the connecting portion 270 on the member 230.

Contact portions 277 and 278 may be formed at both ends of the conductive pattern 271, respectively. Each of the contact portions 277 and 278 is formed broader than other portions of the conductive pattern 271, so that the contact portions 277 and 278 can be more easily to the circuit board 250 or the interlock portion 241 or 242.

Although not shown in this figure, in a case where the member 230 is made of a non-conductive material, the pad 273 is not used, but the conductive pattern 271 may be directly formed on the member 230.

Referring to FIG. 5B, the connecting portion 290 including a plurality of conductive patterns 291 and 292 and a plurality of pads 293 and 294 may be formed on the member 230.

In a case where the member 230 is made of a conductive material, the first pad 293 is formed on the member 230, and the first conductive pattern 291 is formed on the first pad 293. The second pad 294 is formed on the first conductive pattern 291, and the second conductive pattern 292 is formed on the second pad 294.

Contact portions 295 and 296 may be formed at both ends of the first conductive pattern 291, respectively, and contact portions 297 and 298 may be formed at both ends of the second conductive pattern 292, respectively. Each of the contact portions 295, 296, 297 and 298 is formed broader than other portions of the conductive patterns, so that the contact portions 295, 296, 297 and 298 can be more easily connected to the circuit board 250 or the interlock portion 241 or 242.

Here, at least one portion of each of the first and second conductive patterns 291 and 292 is exposed so as to be electrically connected to the circuit board 250 or the interlock portion 241 or 242. For example, the first conductive pattern 291 is formed to have a first length, and the contact portions 295 and 296 are formed at both the ends of the first conductive pattern 291, respectively. The second pad 294 is formed to cover the first conductive pattern 291 so that the contact portions 295 and 296 are exposed. The second conductive pattern 292 is formed on the second pad 294, and the contact portions 297 and 298 are formed at both the ends of the second conductive pattern 292, respectively. When viewing the connecting portion 290 from the top, it can be seen that the contact portions 295 and 296 of the first conductive pattern 291 and the contact portions 297 and 298 of the second conductive pattern 292 are exposed to the outside.

A connection terminal of the circuit board 250 or the interlock portion 241 or 242 contacts each of the contact portions 295 and 296 of the first conductive pattern 291 and the contact portions 297 and 298 of the second conductive pattern 292 so that the circuit board 250 or the interlock portion 241 or 242 can be electrically connected to the connecting portion 290.

In a case where the member 230 is made of a non-conductive material, the first pad 293 is not used, and the first conductive pattern 291 is directly formed on the member. An intermediate pad is formed on the first conductive pattern 291, and the second conductive pattern 292 is formed on the intermediate pad.

Although it has been illustrated in this figure that the connecting portion 290 is formed with the first and second conductive patterns 291 and 292, the connecting portion 290 may be formed with three or more conductive patterns.

As described above, the patterns are stacked on the member 230, so that the area of the connecting portion can be decreased. Accordingly, it is possible to expand the mounting space in the mobile terminal and to improve the degree of freedom in the design of the mobile terminal.

Figure 6:
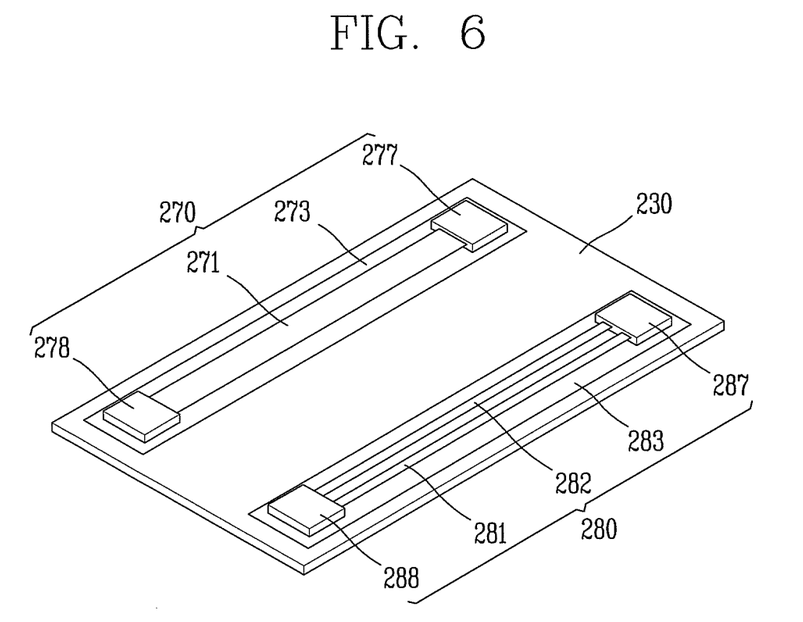
FIG. 6 is a conceptual view illustrating an example in which a connecting portion is formed on a frame.

FIG. 6 is a conceptual view illustrating an example in which the connecting portion is formed on the frame 230.

The connecting portions 270 and 280 are formed on one surface of the frame 230 as the member supporting the inside of the mobile terminal. As shown in FIG. 6, the connecting portion may be formed in plural numbers on the frame 230. Pads 273 and 283 may be formed to respectively cover regions on the one surface of the 230. A conductive pattern 271 may be formed on the pad 273, and conductive patterns 281 and 282 may be formed on the pad 283. The connecting portions 270 and 280, as described above, may be formed by forming a plurality of conductive patterns on the same plane or by stacking a plurality of patterns.

Here, the first connecting portion 280 may connect the antenna device 241 and the circuit board 250 to each other. In this case, the circuit board 250 may include a controller formed to process a radio signal transmitted/received through the antenna device 241.

The second connecting portion 270 may connect the circuit 250 and another interlock portion 242 to each other. The interlock portion 242, as described above, may be any one of a socket, a user input unit, a sensing unit and an output unit. More specifically, the interlock portion 242 may be the user input unit that transmits, to the circuit board 250, a signal generated by a user's touch. The interlock portion 242 may be an LED illuminator flickered by a predetermined operation of the mobile terminal or a speaker for outputting voice. In addition, the interlock portion 242 may be a sensor for sensing a user's operation.

Contact portions 287 and 288 are formed at both ends of the first connecting portion 280, respectively, and contact portions 277 and 278 are formed at both ends of the second connecting portion 270, respectively. Each of the contact portions 277, 278, 287 and 288 is formed broader than other portions of the connecting portions so that the contact portions 277, 278, 287 and 288 can be more easily connected to the circuit board 250 or the interlock portion 241 or 242. The circuit board 250 or the interlock portion 241 or 242 may have connection terminals formed to contact the contact portions 277, 278, 287 and 288.

For example, as shown in FIG. 4, a connection terminal 243 of the interlock portion 242 electrically connects the contact portion 278 and the interlock portion 242 to each other.

Figure 7:
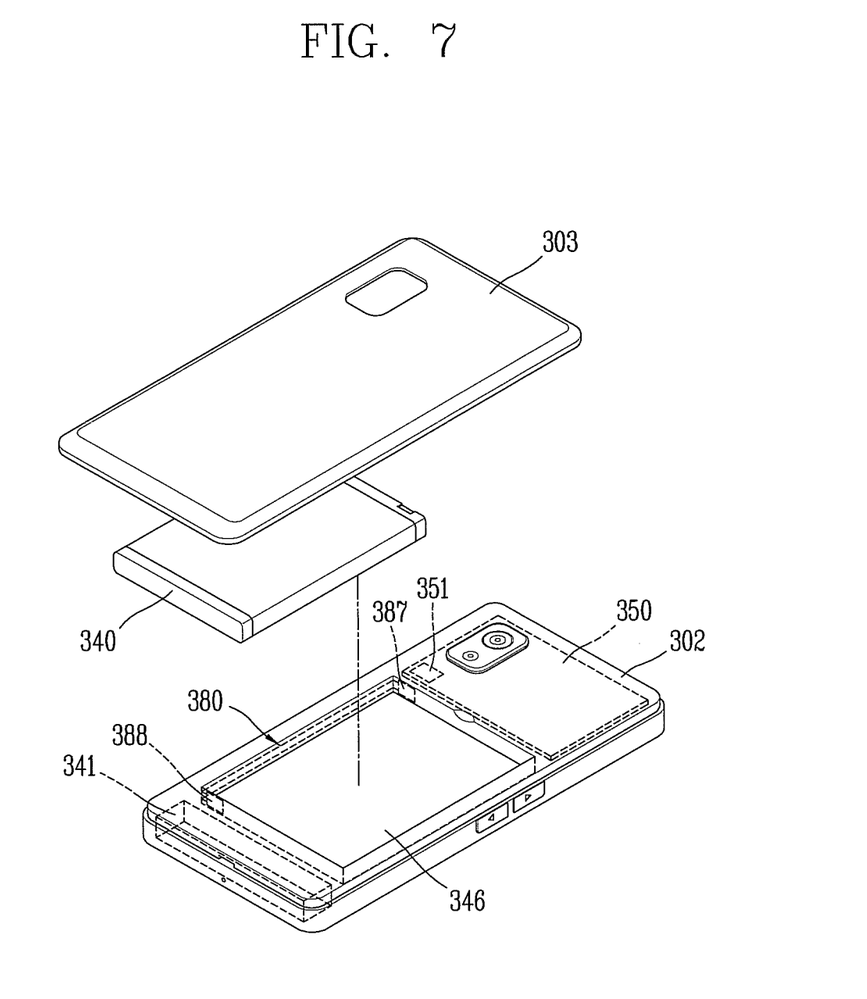
FIG. 7 is a conceptual view illustrating an example in which a connecting portion is formed on a case.

FIG. 7 is a conceptual view illustrating an example in which a connecting portion 380 is formed on a case 302.

The case 302 as a member forming the exterior appearance of the mobile terminal may be a rear case. The rear case 302 may include an accommodating portion 346 in which a battery 340 is accommodated.

The connecting portion 380 may be formed on at least one surface of the rear case 302 defining the accommodating portion 346. The connecting portion 380 may be formed along at least one of the inside and outside of the rear case 302. Contacting portions 387 and 388 electrically connected to a circuit board 350 or an interlock portion 341 may be formed at both ends of the connecting portion 380, respectively.

Connection terminals 351 may be formed so that the circuit board 350 and the interlock portion 341 are electrically connected to the contact portions 387 and 388, respectively. That is, a first contact portion formed at one side of the connecting portion 380 may be connected to the connection terminal of the circuit board 350, and a second contact portion formed at the other side of the connecting portion 380 may be connected to the connection terminal of the interlock portion 341.

The connection terminals may be formed of a metal material having elasticity. The connection terminals store elastic energy when pressure is applied, and return to their original shapes when the pressure is released.

Here, the interlock portion 341, as described above, may be any one of an antenna device, a socket, a user input unit, a sensing unit and an output unit. The circuit board 350 may include a controller controlling the interlock portion 341 using an electrical signal so that the interlock portion 341 performs a predetermined operation.

As described above, the connecting portion 380 is formed on the case 302, so that the interlock portion 341 and the circuit board 350 can communicate electrical signals with each other.

According to the exemplary embodiment shown in FIG. 7, the interlock portion 341 and the circuit board 350 are electrically connected to each other only by assembling the circuit board 350 and the interlock portion 341 to the case 302 having the connecting portion 380 formed thereon. Thus, the assembling process can be simplified, thereby decreasing the number of processes. Further, material cost can be reduced, thereby decreasing production cost.

Figure 8:
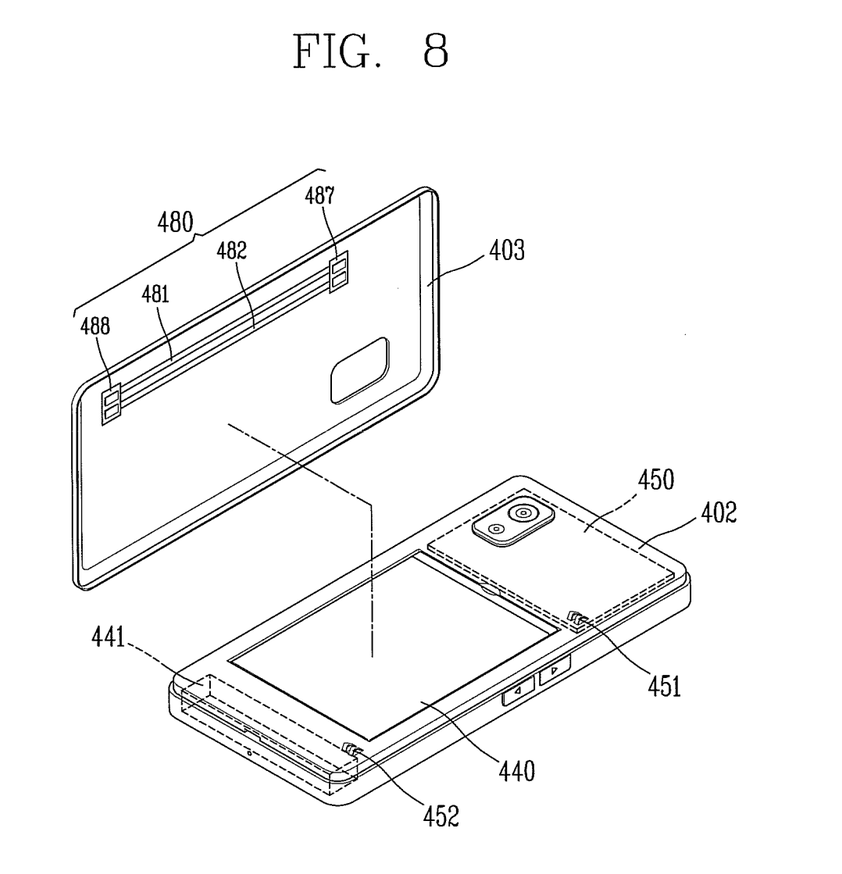
FIG. 8 is a conceptual view illustrating an example in which a connecting portion is formed on a battery case.

FIG. 8 is a conceptual view illustrating an example in which a connecting portion 480 is formed on a battery case 403.

The battery case 403 as a member forming the exterior appearance of the terminal main body is formed to cover a rear case 402 and a battery 440.

The connecting portion 480 is formed on one surface of the battery case 403. The connecting portion 480 may be formed in plural numbers, and each of the plurality of connecting portions 480 may include a plurality of conductive patterns having a single-layered or multi-layered structure. A first contact portion 487 and a second contact portion 488 are formed at both ends of the connecting portion 480, respectively.

A connection terminal 451 of a circuit board 450, corresponding to the first contact portion 487, and a connection terminal 452 of an interlock portion 441, corresponding to the second contact portion 488, are disposed on one surface of the rear case 402 opposite to the connecting portion 480.

The rear case 402 may include holes so that the connection terminals 451 and 452 pass inside/outside. The circuit board 450 may be disposed at an inner upper portion of the rear case 402, and the interlock portion 441 may be disposed at an inner lower portion of the rear case 402. The connection terminals 451 connect the circuit board 450 and the interlock portion 441, disposed inside the rear case 402, to the contact portions 487 and 488 of the battery case 403, respectively.

The contact portions 487 and 488 of the connecting portion 480 formed on the battery case 403 are electrically connected to each other in the state in which the battery case 403 is coupled to the terminal main body configured with front and rear cases. Thus, the connecting portion 480 can electrically connect the interlock portion 441 and the circuit board 450 to each other, and the interlock portion 441 and the circuit board 450 can communicate signals with each other through the connecting portion 480.

Figure 9:
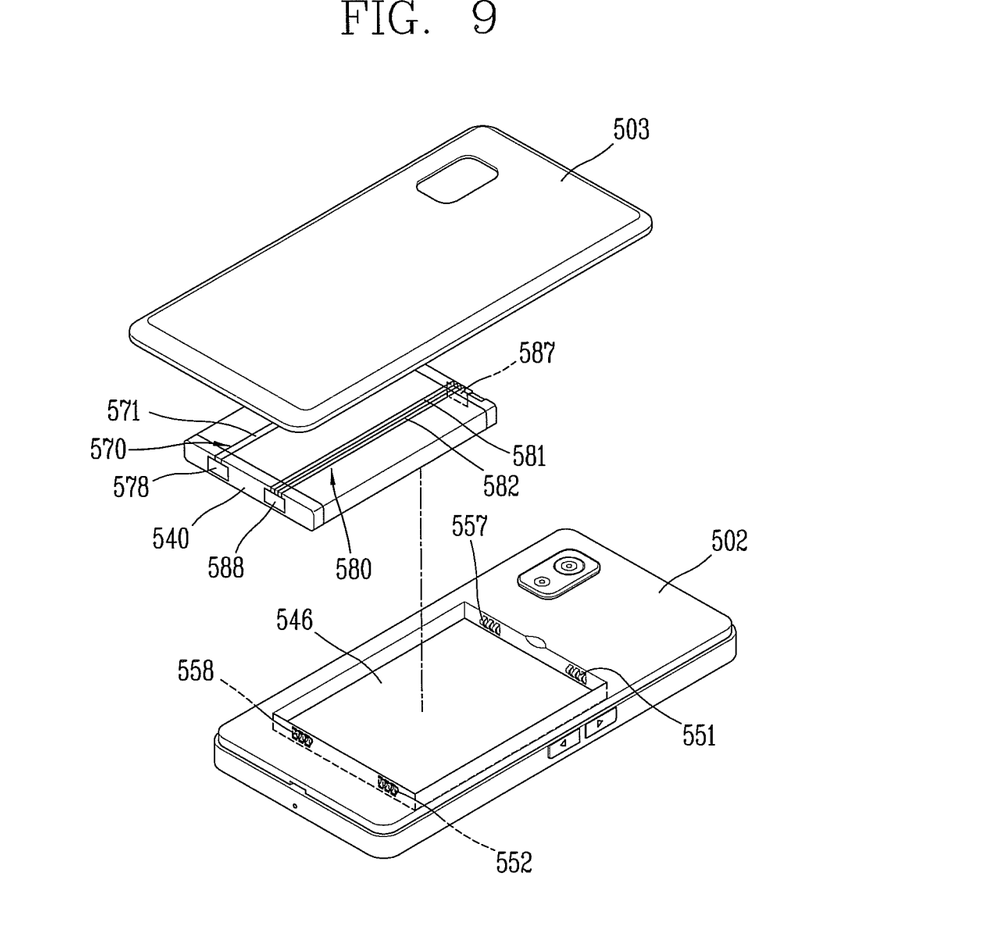
FIG. 9 is a conceptual view illustrating an example in which a connecting portion is formed on a battery.

FIG. 9 is a conceptual view illustrating an example in which a connecting portion 570 and 580 is formed on a battery 540.

The battery 540 as a member supplying power to the mobile terminal may be accommodated in a battery accommodating portion 546 of a rear case 502.

The connecting portion 570 and 580 may be formed on any one surface of the battery 540. The connecting portion 570 and 580 may be formed in plural numbers, and each of the plurality of connecting portions 570 and 580 may include a plurality of conductive patterns have a single-layered or multi-layered structure. First and second contact portions 577 and 578 are formed at both ends of the connecting portion 570, respectively, and first and second contact portions 587 and 588 are formed at both ends of the connecting portion 580.

The first contact portions 577 and 587 and the second contact portions 578 and 588 may be formed at both sides of the battery 540, opposite to each other. First connection terminals 551 and 558 connecting the first contact portions 577 and 587 and a circuit board (not shown) to each other may be formed a first side of the battery accommodating portion 546, and second connection terminals 552 and 558 connecting the second contact portions 578 and 588 and an interlock portion (not shown) to each other may be formed at a second side of the battery accommodating portion 546. The first and second sides may be both sides of the battery accommodating portion 546, opposite to each other.

Thus, if the battery 540 is accommodated in the battery accommodating portion 546, the interlock portion and the circuit board can be electrically connected to each other. The connecting portions 570 and 580 can electrically connect the interlock portion and the circuit board to each other, and the interlock portion and the circuit board can communicate signals with each other through the connecting portions 570 and 580.

Figure 10:
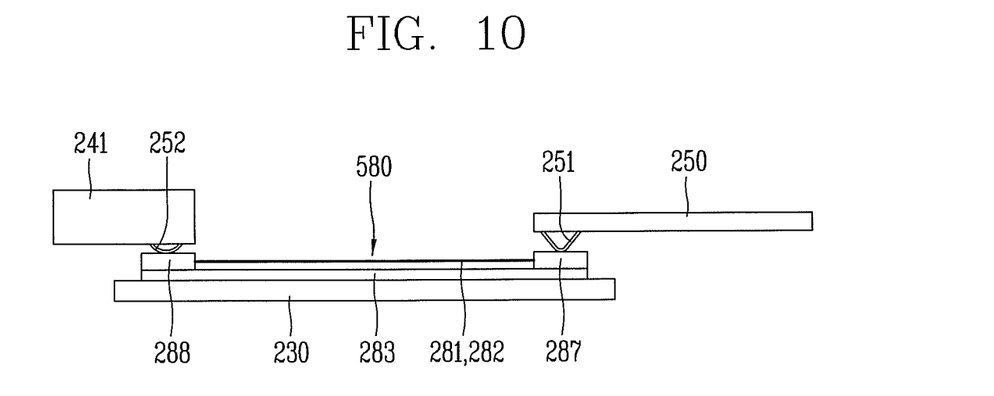
FIG. 10 is a conceptual view illustrating an example in which a connecting portion by which an interlock portion and a circuit board are connected to each other is formed on a battery case.

FIG. 10 is a conceptual view illustrating an example in which a connecting portion 280 by which an interlock portion 241 and a circuit board 250 are connected to each other is formed on a battery case 203.

Contact portions 287 and 288 are formed at both ends of the connecting portion 280, respectively. The first contact portion 287 is connected to a connection terminal 251 formed on the circuit board 250. The second contact portion 288 is connected to a connection terminal 252 of the interlock portion 241.

For example, in a case where the interlock portion 241 is the antenna device 241, the connecting portion 280 may be configured with two conductive patterns 281 and 282 parallel with each other. In this case, the first conductive pattern 281 may correspond to an outer conducting line of a coaxial cable, and the second conductive pattern 282 may correspond to an outer conducting line of the coaxial cable.

As described above, according the exemplary embodiments, the conductive pattern, instead of a flexible cable, flexible circuit board or coaxial cable, is formed on any one of members constituting the mobile terminal, so that the circuit board and the interlock portion can be electrically connected to each other.

Thus, it is not required to secure a separate space in which the flexible cable, flexible circuit board or coaxial cable is disposed inside the mobile terminal. Accordingly, it is possible to secure a space in which other devices can be mounted inside the mobile terminal. Further, the structure in the mobile terminal is simplified, so that it is possible to decrease the number of assembling processes and to reduce production cost of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a terminal body having a plurality of members;
   a circuit board mounted at an upper portion of the terminal body and an antenna device mounted at a lower portion of the terminal body, the antenna device being spaced from the circuit board; and
   a connecting portion to electrically connect the circuit board and the antenna device,
   wherein the connecting portion includes a conductive pattern formed on a surface of one of the plurality of members to define a separate space between the circuit board and the antenna device,
   wherein contact portions are formed at both ends of the conductive pattern, a first one of the contact portions is connected to the circuit board and a second one of the contact portions is connected to the antenna device,
   wherein a third one of the contact portions is connected to the circuit board, and a fourth one of the contact portions is connected to the antenna device, and
   wherein the first one of the contact portions is spaced from the third one of the contact portions, and the second one of the contact portions is spaced from the fourth one of the contact portions,
   wherein the first one of the contact portions is broader than other portions of the conductive pattern between the first one of the contact portions and the second one of the contact portions, and
   wherein the third one of the contact portions is broader than other portions of the conductive pattern between the third one of the contact portions and the fourth one of the contact portions.

2. The mobile terminal of claim 1, wherein the circuit board includes a controller to process a signal transmitted through the antenna device or received through the antenna device.

3. The mobile terminal of claim 1, wherein the circuit board includes a connection terminal to contact the first one of the contact portions.

4. The mobile terminal of claim 1, wherein the connecting portion includes a non-conductive pad on the surface of the one of the plurality of members such that the non-conductive pad is between the conductive pattern and the surface.

5. The mobile terminal of claim 4, wherein the conductive pattern includes a first pattern and a second pattern spaced from the first pattern on a surface of the non-conductive pad.

6. The mobile terminal of claim 1, wherein the conductive pattern includes a first pattern, a second pattern and a non-conductive material provided between the first pattern and the second pattern.

7. The mobile terminal of claim 1, wherein the member is a frame to support an inside of the mobile terminal, and the connecting portion is provided on a surface of the frame.

8. The mobile terminal of claim 1, wherein the member is a case to provide an exterior appearance of the mobile terminal, and the connecting portion is provided on a surface of the case.

9. The mobile terminal of claim 1, wherein the member is a battery to supply power to the mobile terminal, and the connecting portion is provided on a surface of the battery.

10. The mobile terminal of claim 9, wherein the terminal body has an accommodating portion to accommodate the battery, and
    wherein, when the battery is provided in the accommodating portion, a first connection terminal connecting the connecting portion to the circuit board is at a first side of the accommodating portion, and a second connection terminal connecting the connecting portion to the antenna device is at a second side of the accommodating portion.

11. A mobile terminal comprising:
    a terminal body having a circuit board at an upper portion of the terminal body, and the terminal body having a plurality of members;
    an interlock portion at a lower portion of the terminal body, the interlock portion being spaced from the circuit board, and the interlock portion to communicate electrical signals with the circuit board; and
    a connecting portion to electrically connect the circuit board to the interlock portion,
    wherein the connecting portion includes a conductive pattern on one of the plurality of members to define a separate space between the circuit board and the interlock portion,
    wherein contact portions are formed at both ends of the conductive pattern, a first one of the contact portions is connected to the circuit board and a second one of the contact portions is connected to the interlock portion, and the conductive pattern to extend from the interlock portion to the circuit board,
    wherein a third one of the contact portions is connected to the circuit board, and a fourth one of the contact portions is connected to the interlock portion, and
    wherein the first one of the contact portions is spaced from the third one of the contact portions, and the second one of the contact portions is spaced from the fourth one of the contact portions,
    wherein the first one of the contact portions is broader than other portions of the conductive pattern between the first one of the contact portions and the second one of the contact portions, and
    wherein the third one of the contact portions is broader than other portions of the conductive pattern between the third one of the contact portions and the fourth one of the contact portions.

12. The mobile terminal of claim 11, wherein the circuit board includes a controller to control the interlock portion such that the interlock portion performs a specific operation.

13. The mobile terminal of claim 11, wherein the circuit board includes a connection terminal to contact the first one of the contact portions.

14. The mobile terminal of claim 11, wherein the member is a battery to supply power to the mobile terminal, and the connecting portion is formed on one surface of the battery.

15. The mobile terminal of claim 14, wherein the terminal body has an accommodating portion to accommodate the battery, and
wherein when the battery is provided in the accommodating portion, a first connection terminal connecting the connecting portion to the circuit board is provided at a first side of the accommodating portion, and a second connection terminal connecting the connecting portion to the interlock portion is provided at a second side of the accommodating portion.

16. The mobile terminal of claim 11, wherein the connecting portion further includes a non-conductive pad on the member.

17. The mobile terminal of claim 16, wherein the conductive pattern includes a plurality of patterns that are spaced apart from each other on one surface of the non-conductive pad.

18. The mobile terminal of claim 11, wherein the conductive pattern includes a plurality of patterns stacked with a non-conductive material between two of the plurality of patterns.

19. The mobile terminal of claim 11, wherein the interlock portion is an antenna device to transmit radio signals and to receive radio signals.

20. The mobile terminal of claim 11, wherein the interlock portion is one of a socket, a user input unit, a sensing unit or an output unit.

21. The mobile terminal of claim 1, wherein the antenna device is provided inside the terminal body.

* * * * *